United States Patent
Wirthlin

(10) Patent No.: US 7,161,165 B2
(45) Date of Patent: Jan. 9, 2007

(54) OPTICAL TRANSDUCER FOR CONTINUOUSLY DETERMINING LIQUID LEVEL

(75) Inventor: Alvin R. Wirthlin, Lucas, TX (US)

(73) Assignee: Opti Sensor Systems, LLC, Lancaster, VA (US)

( * ) Notice: Subject to any disclaimer, the term of this patent is extended or adjusted under 35 U.S.C. 154(b) by 0 days.

(21) Appl. No.: 10/886,174

(22) Filed: Jul. 7, 2004

(65) Prior Publication Data

US 2006/0006353 A1    Jan. 12, 2006

(51) Int. Cl.
  *G01F 23/292*    (2006.01)
(52) U.S. Cl. .......................................... 250/577; 385/12
(58) Field of Classification Search ........ 250/573–577, 250/227.24, 227.25; 385/12; 73/290 R, 73/293
See application file for complete search history.

(56) References Cited

U.S. PATENT DOCUMENTS

| | | | |
|---|---|---|---|
| 2,240,988 A | 5/1941 | Hertel | 73/293 |
| 3,417,614 A | 12/1968 | Ryder | 73/327 |
| 3,417,730 A | 12/1968 | Colley et al. | 116/227 |
| 3,448,616 A | 6/1969 | Wosrtl et al. | 73/293 |
| 3,683,196 A | 8/1972 | Obenhaus | 250/227.11 |
| 3,844,171 A | 10/1974 | Rodger | 73/293 |
| 3,995,169 A * | 11/1976 | Oddon | 250/577 |
| 4,157,038 A * | 6/1979 | Yamamoto | 73/313 |
| 4,194,396 A * | 3/1980 | Ohsawa et al. | 73/311 |
| 4,287,427 A | 9/1981 | Scifres | 250/577 |
| 4,311,048 A | 1/1982 | Merz | 73/293 |
| 4,443,699 A | 4/1984 | Keller | 250/227.11 |
| 4,489,602 A | 12/1984 | Henning | 73/327 |
| 4,644,177 A | 2/1987 | Barabino | 250/577 |
| 4,745,293 A | 5/1988 | Christensen | 250/577 |
| 4,870,292 A | 9/1989 | Alpert et al. | 250/577 |
| 4,880,971 A | 11/1989 | Danisch | 340/619 |
| 4,904,878 A | 2/1990 | Gipp et al. | 250/577 |
| 4,942,306 A | 7/1990 | Colbourne | 250/577 |
| 4,950,885 A | 8/1990 | Kershaw | 250/227.25 |
| 4,994,682 A | 2/1991 | Woodside | 250/577 |
| 5,077,482 A | 12/1991 | Vali et al. | 250/577 |
| 5,291,032 A | 3/1994 | Vali et al. | 250/577 |
| 6,172,377 B1 | 1/2001 | Weiss | 250/577 |
| 6,173,609 B1 | 1/2001 | Modlin et al. | 73/293 |
| 6,333,512 B1 * | 12/2001 | Wirthlin | 250/577 |
| 6,429,447 B1 | 8/2002 | Nowak et al. | 250/573 |
| 6,668,645 B1 | 12/2003 | Gilmour et al. | 73/290 R |
| 6,831,290 B1 * | 12/2004 | Mentzer | 250/577 |
| 2003/0155538 A1 | 8/2003 | Siepmann | 250/577 |

* cited by examiner

*Primary Examiner*—Thanh X. Luu
*Assistant Examiner*—Stephen Yam
(74) *Attorney, Agent, or Firm*—Alvin R. Wirthlin

(57) ABSTRACT

An optical transducer for determining liquid level within a container includes a sensing probe having a first elongate measurement face and a second elongate measurement face that converges toward the first measurement face. A light source is positioned for directing radiant energy into the sensing probe and a photosensor is positioned for detecting an amount of radiant energy exiting the sensing probe. With this arrangement, a change in the amount of radiant energy as detected by the photosensor is indicative of a change in liquid level within the container.

17 Claims, 4 Drawing Sheets

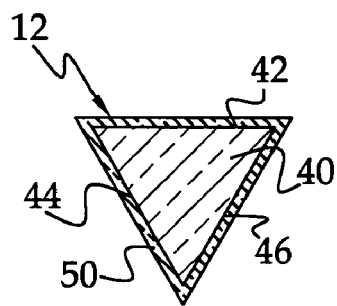
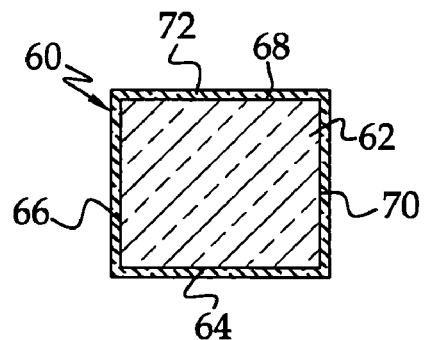
FIG. 3　　　　　　　　FIG. 4
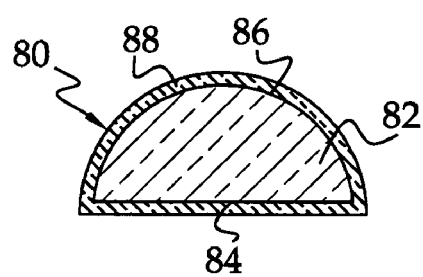
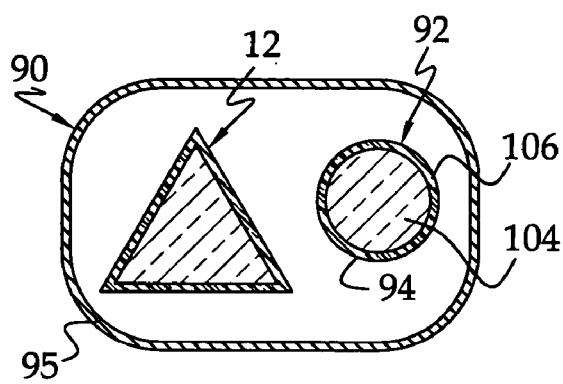
FIG. 5　　　　　　　　FIG. 8

OPTICAL TRANSDUCER FOR CONTINUOUSLY DETERMINING LIQUID LEVEL

BACKGROUND OF THE INVENTION

This invention relates to optical transducers, and more particularly to optical transducers for determining liquid level within tanks and the like.

Transducers for measuring liquid level are often used in vehicles, industrial equipment and other stationary and mobile systems. The electrical output of such transducers change in response to a change in the liquid being measured, and is typically in the form of a change in resistance, capacitance, current flow, magnetic field, frequency, and so on. These types of transducers may include variable capacitors or resistors, optical components, Hall Effect sensors, strain gauges, ultrasonic devices, and so on.

By way of example, prior art liquid level sensors, such as fuel level sensors for motor vehicles, usually include a float that rides on an upper surface of the fuel in a fuel tank. The float is typically connected to one end of a pivot arm while the other end of the pivot arm includes a wiper mechanism that brushes against a resistor strip when the arm is rotated due to a change in fuel level in the tank. Such sensors are prone to wear, mechanical and/or electrical breakdown, as well as inaccurate liquid level detection.

In an effort to overcome these drawbacks, liquid level transducers with no moving parts have been developed. Such transducers include heated wires or thick film devices wherein the liquid being measured functions as a heat sink, variable capacitance devices wherein the measured liquid functions as the dielectric, ultrasonic devices, optical devices, and Hall-Effect devices. Many of these liquid level transducers suffer from one or more of the following disadvantages: the detection of liquid level may be inaccurate; fine wires can be affected by vibration and movement, such as with heated wire probes; fuel additives and contaminants can cause corrosion of various transducer components; the electrical output of the transducer may vary due to water or contaminants in the fuel, such as with capacitance-type probes; and such transducers may be cost-prohibitive in many applications.

With respect to optical-type liquid level transducers, it has previously been difficult to economically construct an optical liquid level sensor for fuels or other liquids, due to the relatively high cost of materials that are resistant to the liquids being measured as well the refractive index of some optical materials, as they tend to be higher than the refractive index of the liquids. By way of example, a low-cost material such as acrylic, although resistant to many liquids, has a refractive index of approximately 1.49, while water has a refractive index of approximately 1.32 and unleaded gasoline has a refractive index of approximately 1.38. When a cylindrical probe constructed of acrylic is positioned in the liquid, any light entering through one end the probe will typically be totally internally reflected along the probe length. Accordingly, the light output from the probe will generally be constant and thus fail to generate a varying signal to be used for liquid level measurement. Materials with a refractive index lower than the liquid to be measured may suffer from other drawbacks, such as high attenuation of light through the material.

BRIEF SUMMARY OF THE INVENTION

According to one aspect of the invention, an optical transducer for determining liquid level includes a sensing probe having a first elongate measurement face and a second elongate measurement face that converges toward the first elongate measurement face. A light source is positioned for directing radiant energy into the sensing probe and a photosensor is positioned for detecting an amount of radiant energy exiting the sensing probe. With this arrangement, a change in the amount of radiant energy as detected by the photosensor is indicative of a change in liquid level.

According to a further aspect of the invention, an optical transducer for determining the level of a liquid having a first refractive index includes a sensing probe constructed of a transparent material with a second refractive index that is greater than the first refractive index. The sensing probe has a first elongate measurement face and a second elongate measurement face that converges toward the first elongate measurement face. A film with a refractive index that is less than the second refractive index covers the measurement faces. A light source is positioned for directing radiant energy into the sensing probe while a photosensor is positioned for detecting an amount of radiant energy exiting the sensing probe. The first and second measurement faces are arranged such that a portion of the radiant energy exits the probe in the presence of the liquid. In this manner, a change in the amount of radiant energy as detected by the photosensor is indicative of a change in liquid level.

According to yet a further aspect of the invention, a method of measuring liquid level comprises continuously sensing liquid level with an optical sensing probe, generating a first output signal based on the sensed liquid level, sensing a predetermined liquid level with an optical switch, and compensating the first output signal by adjusting the first output signal to reflect the predetermined liquid level.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 3 is an enlarged cross sectional view of the optical liquid level transducer taken along line 3—3 of FIG. 1;

FIG. 4 is a cross sectional view of an optical liquid level transducer according to a further embodiment of the invention;

FIG. 5 is a cross sectional view of an optical liquid level transducer according to an even further embodiment of the invention;

FIG. 8 is a sectional view taken along line 8—8 of FIG. 7.

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
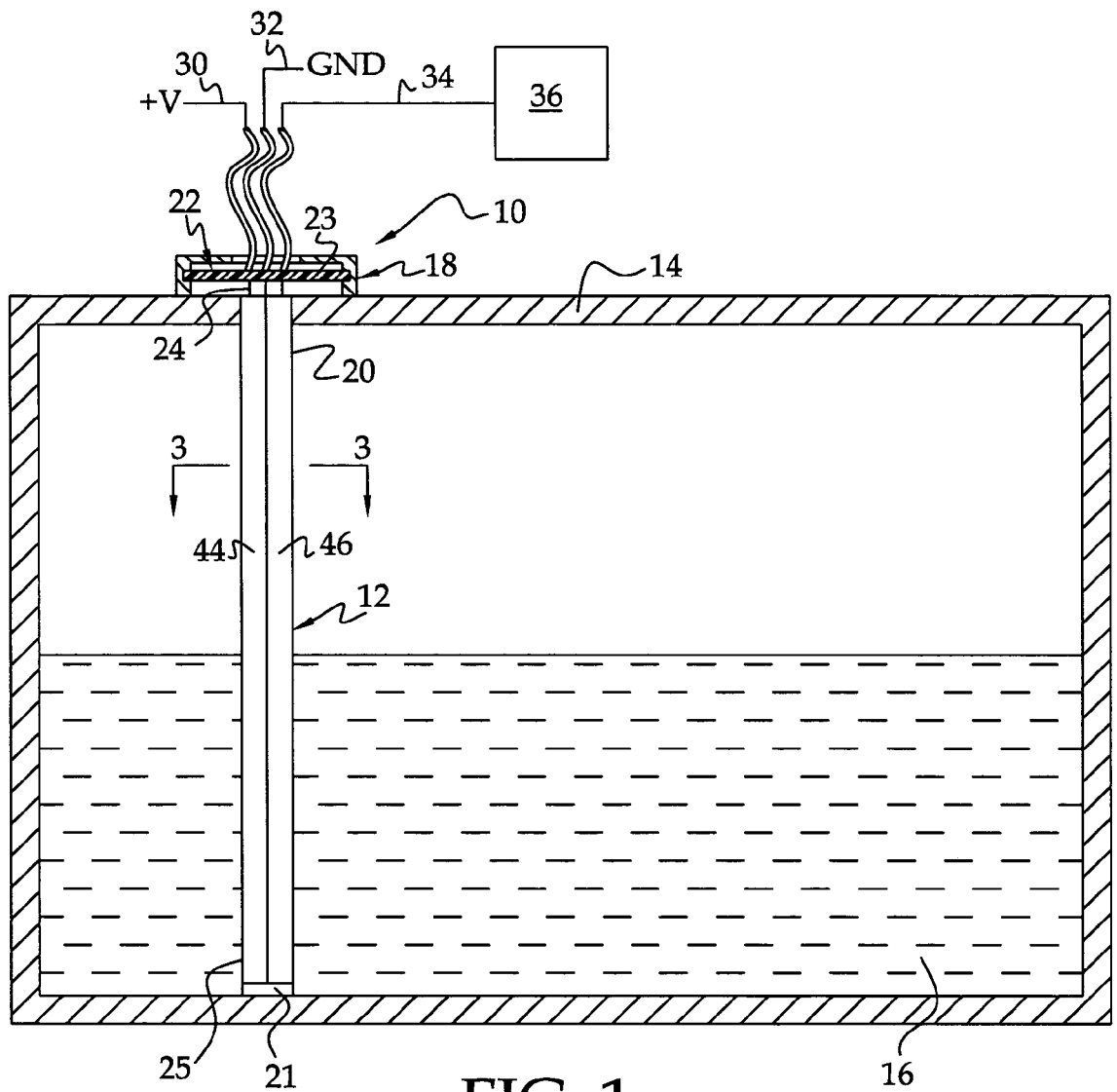
FIG. 1 is a side elevational view in partial cross section of an optical liquid level transducer according to a first embodiment of the invention mounted in a container.
Figure 2:
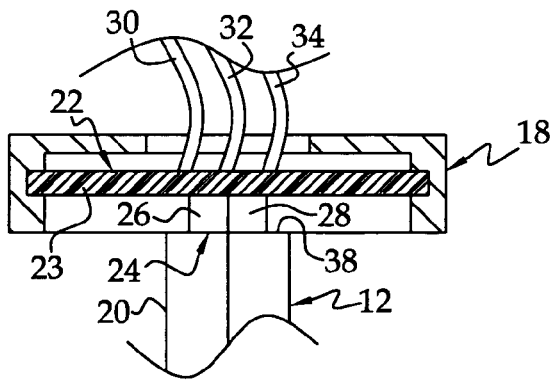
FIG. 2 is an enlarged view of a mounting head that forms part of the optical liquid level transducer of FIG. 1.

Referring now to the drawings, and to FIG. 1 in particular, an optical liquid level transducer 10 according to an exemplary embodiment of the present invention is illustrated. The liquid level transducer 10 includes an elongate, transparent sensing probe 12 that is adapted for mounting in a container 14, such as a fuel tank, oil reservoir, radiator, brake fluid chamber, or any other container for holding and/or transporting a liquid 16. A mounting head 18 is located at an upper end 20 of the sensing probe 12 while a reflective element 21 is located at a lower end 25 of the probe. The mounting head 18 may be secured to the sensing probe by adhesives, ultrasonic welding, mutually engageable threads on the head and probe, or other well-known attachment means. The reflective element 21 may be a reflective coating, mirror, metallic tape, or other well known reflection means.

Electrical circuitry 22 is positioned within the mounting head 18 and preferably includes a printed circuit board 23 and a detector assembly 24 positioned between the circuit board 23 and an end face 38 of the sensing probe 12. Electrical wires 30, 32 and 34 are connected to the PCB for providing power input, ground, and signal output for driving a display 36, respectively.

The detector assembly 24 includes a light source 26 for emitting radiant energy into the sensing probe 12 from the end face 38 and a photosensor 28 for detecting the radiant energy emitted from the end face of the probe. As shown, the light source 26 and photosensor 28 are preferably formed as an integrated package. However, the light source and photosensor may be separate elements.

By way of example, a suitable detector assembly 2,4 may be in the form of a reflective object sensor, such as QRD1114 provided by Fairchild Semiconductor. The reflective object sensor includes an integrated infrared LED emitter and a phototransistor supplied in a single package. Preferably, the reflective object sensor abuts the end face 38 of the sensing probe 12 or is at least closely adjacent thereto. Alternatively, a suitable light source may include a high brightness through-hole or surface-mount LED. Likewise, a suitable photosensor may include a separate through-hole or surface-mount phototransistor.

It is understood that other light sources can be used, such as, without limitation, incandescent bulbs, fluorescent lights, laser diodes, or any other source that emits radiant energy in one or more of the ultra-violet, visible or infra-red spectrums. It is further understood that other photosensors can be used, such as, without limitation, photocells, photodiodes, and photoconductors.

It will be appreciated that the position of the light source 26 and photosensor 28 may be reversed, or may be located at other positions on the sensing probe 12. It will be further appreciated that the light source and photosensor may be remotely located from the end 20 of the sensing probe 12 and positioned for emitting light into the sensing probe and receiving light therefrom, respectively, through intermediate members such as fiber optics, transparent rods, or other suitable light guides. In addition, although it is preferred that the light source and photosensor be located at the same end of the sensing probe 12, they may be located at opposite ends of the probe.

With additional reference to FIG. 3, the sensing probe 12 in accordance with one embodiment of the present invention includes a core 40 that is triangular in cross section with a first elongate measurement face 42, a second elongate measurement face 44 that converges with the first measurement face, and a third elongate measurement face 46 that converges with the first and second measurement faces. The core 40 can be formed by extrusion, injection molding, continuous casting, or other well-known forming technique. Depending on the particular application of the optical transducer 10, the core 40 can be constructed of a rigid, semi-rigid, semi-flexible or flexible material in a variety of different sizes and cross sectional shapes. Preferably, the core 40 is constructed of a transparent material.

It will be understood that the term "transparent" as used herein refers to a material condition that ranges from optically clear to opaque for various wavelengths of radiant energy. By way of example, some materials that allow transmission of a substantial amount of radiant energy in the visible light region of the electromagnetic spectrum may not allow significant transmission of radiant energy in the infrared or other regions. A suitable transparent material would thus allow the transmission of a measurable amount of radiant energy of a selected wave length through the probe 12. By way of example, the core 40 can be constructed of plastic material such as acrylic, nylon, polyetherimide, polysulfone, polyurethane, polycarbonate, polypropylene, polyvinyl chloride (PVC), silicon, glass material such as borosilicate or quartz, Teflon® material such as PTFE, FEP, ETFE, and so on. However, it will be understood that the present invention is not limited to the particular materials described.

In order to enhance the optical response of the probe 12, repel liquids and contaminants, and/or protect the core 40 from the liquid being measured, a low surface energy film or cladding 50 can be applied to the measurement faces 42, 44 and 46 of the core 40, and preferably to the entire probe body that will be exposed to liquid, including the exposed end of the reflective element 21. Depending on the type of liquid being measured, a suitable film 50 can comprise a transparent fluorinated polyurethane, such as 51PC106 provided by $21^{st}$ Century Coatings Canada Ltd. Other fluorinated polymer materials can be used for the film 50, such as Novec™ provided by 3M. Another suitable film can comprise a heat or UV curable silicone hardcoat, such as PHC587 or UVHC3000 provided by GE Silicones. When the core 40 is constructed of glass or other high melting point material, a suitable fluoropolymer film may be applied to the core and cured at elevated temperatures. The film 50 is preferably applied to the core 40 in a liquid state by spraying or dipping. However, it will be understood that other materials and/or coating techniques can be used. In accordance with a further embodiment of the invention, the film 50 may comprise heat-shrinkable fluoropolymer tubing, such as fluorinated ethylene propylene (FEP), that is shrunk over the core 40.

The film 50 should have a lower index of refraction than the core 40 so that at least a portion of the radiant energy from the light source 26 is reflected off the measurement faces and back into the core in the absence of liquid. By way of example, a core 40 constructed of acrylic has a refractive index of approximately 1.49 while a fluorinated polysilicone hardcoat film has a refractive index of approximately 1.42. With such an arrangement, it has been found that the voltage differential of the sensing probe between fully immersed and dry conditions for different liquids is greatly enhanced.

In operation, radiant energy from the light source 26 is projected into the probe 12. A portion of the radiant energy travels along the probe, reflecting off the elongate measurement faces 42, 44 and 46 in the absence of liquid until it reaches the reflective element, whereupon it is reflected back towards the photosensor 28. In the presence of liquid, a portion of the radiant energy is refracted out of the probe and into the liquid. The amount of radiant energy refracted out of the probe is proportional to liquid level. Even though the sensing probe 12 may be constructed of a higher refractive index than the liquid being measured, it has been found that the geometric configuration of the measurement faces 42, 44 and 46 ensure that a portion of the radiant energy will exit the probe in the presence of liquid. This feature is a great advantage over prior art solutions since the probe may be constructed using low-cost extrusion techniques or the like.

By way of example, a 12-inch long sensing probe 12 was constructed of an extruded acrylic core 40 of triangular cross section. A reflective element 21 in the form of a reflective metal tape was attached to the lower end of the probe. The core 40 and reflective element 21 were then coated with a film 50 of transparent fluorinated polyurethane and allowed to cure. An infrared reflective object sensor 24 (QRD1114 provided by Fairchild Semiconductor) was positioned against the end face 38 of the sensing probe. A suitable voltage was supplied to the infrared LED emitter 26 and the phototransistor 28 of the reflective object sensor to obtain measurements of radiant intensity emanating from the end face 38 of the probe. Liquid level measurements were made by the probe in increasing volumes of water, unleaded gasoline, and diesel.

Figure 6:
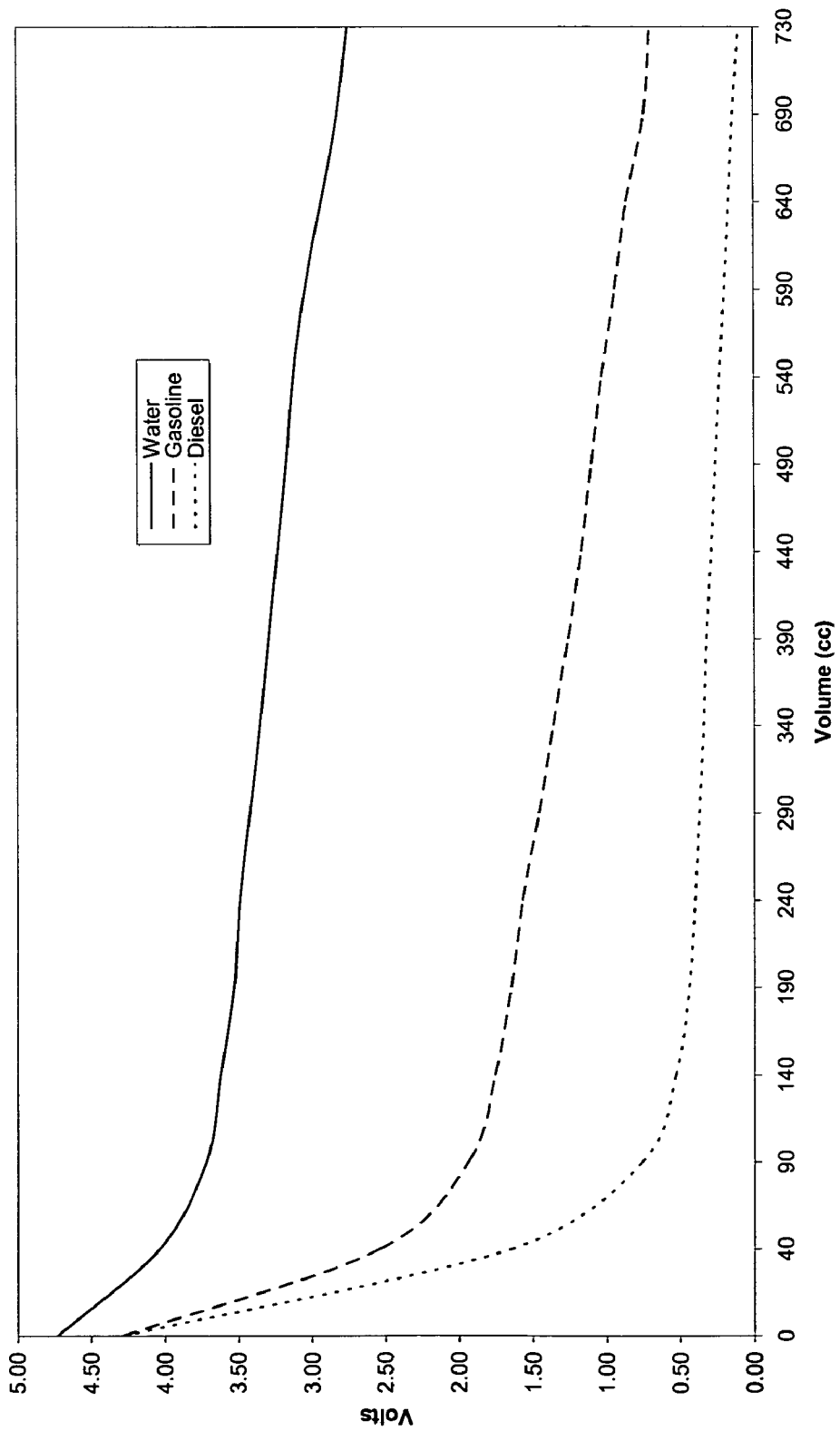
FIG. 6 is a graph of the optical liquid level transducer of FIG. 1 immersed in varying depths of different liquids.

As shown in FIG. 6, the intensity of radiant energy present at the phototransistor 28 for all three liquids is at a maximum in the absence of liquid on the probe (at zero cubic centimeters), which in turn causes the phototransistor to return a maximum voltage signal. In the presence of liquid, the intensity of radiant energy at the phototransistor 28 decreases in proportion to the amount that the probe 12 is immersed in the liquid, to thereby decrease the voltage level of the phototransistor.

It can be seen from FIG. 6 that the measurement curve between completely empty (where the probe is dry) and approximately 125 cubic centimeters (cc) of volume (approximately the lower two inches of the probe) decreases at a rate that is much greater than the remainder of the probe as the liquid level in the container rises. This feature is advantageous since it is desirable in many measurement applications to determine when the liquid level within a container is approaching an empty condition to a greater degree of precision. This feature can also be used to trigger a low liquid level switch when the lower end of the probe 12 is above the bottom of the container 14 to thereby alert an observer of the low liquid level condition. This feature is a great advantage over prior art solutions since the same transducer used for measuring liquid level can also or alternatively be used for indicating a low liquid level condition without added switches or the like components.

It can also be seen from FIG. 6 that for the next approximately 10 inches of probe length (from approximately 125 cc to approximately 730 cc), the voltage output for each of the three liquids is substantially linear.

In order to compensate for ambient light fluctuations, such as when the liquid level transducer 10 is installed in translucent tanks, another photosensor (not shown) can be used for detecting ambient light and, through suitable circuitry, reduce the signal from the photosensor 28 by the ambient light amount. In yet a further embodiment, the light source 26 can be pulsed between an on and off state and the photosensor can detect the incident light during those states. Light detected during the off state could then be subtracted from the light detected during the on state to thereby obtain a true light level reading. The elimination of ambient light can be accomplished through comparator circuitry, a processor such as a microprocessor or microcontroller, and so on. In accordance with a further embodiment of the invention, a light shielding member can be provided, as will be described in greater detail with respect to FIGS. 7 and 8.

With reference now to FIG. 4, a sensing probe 60 in accordance with a further embodiment of the present invention is illustrated. The sensing probe 60 is similar in construction to the sensing probe 12 with the exception that a core 62 with a square or rectangular cross sectional profile is provided. The core 62 includes a first elongate measurement face 64, a second elongate measurement face 66 that converges with the first measurement face, a third elongate measurement face 68 that converges with the second measurement face, and a fourth elongate measurement face 70 that converges with the third and first measurement faces. As in the previous embodiment, a low surface energy film or cladding 72 can be applied to the measurement faces 64, 66, 68 and 70 of the core 62, and preferably to the entire probe body that will be exposed to liquid.

As shown in FIG. 5, a sensing probe 80 in accordance with a further embodiment of the present invention is illustrated. The sensing probe 80 is similar in construction to the sensing probe 12 with the exception that a core 82 with a half-round cross sectional profile is provided. The core 82 includes a first elongate measurement face 84 and a second curved elongate measurement face 86 that converges with opposite ends of the first measurement face. As in the previous embodiments, a low surface energy film or cladding 88 can be applied to the measurement faces 84 and 86 of the core 82, and preferably to the entire probe body that will be exposed to liquid.

It is understood that sensing probes with other cross sectional profiles may be used, such as parallelograms, trapezoids, pentagons, hexagons, octagons and other polygons, star shapes, as well as equilateral, isosceles, and right triangles, as long as the angle of incidence of the radiant energy from the light source on at least one of the probe faces is less than the critical angle for total internal reflection for the probe-liquid interface. When the angle of incidence is less than the critical angle, a portion of the radiant energy will exit the probe in the presence of liquid. In addition, one or more of the elongate measurement faces may be planar, concave and/or convex or converge toward a center of the probe.

Figure 7:
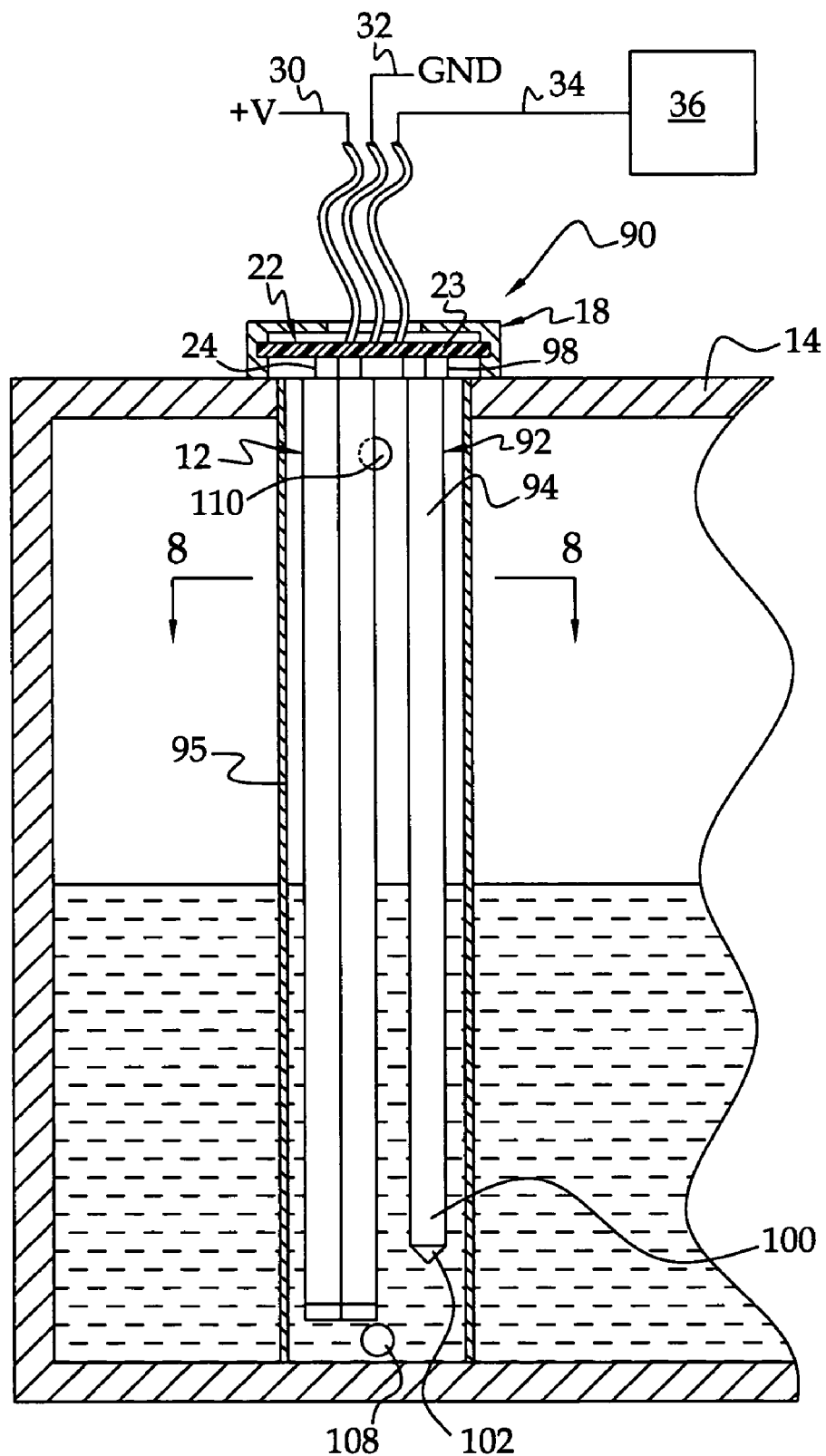
FIG. 7 is a side elevational view in partial cross section of a liquid level transducer according to yet a further embodiment of the invention.

With reference now to FIGS. 7 and 8, a liquid level transducer 90 in accordance with a further embodiment of the invention is illustrated. The liquid level transducer 90 is similar in construction to the transducer 10 previously described, with the exception that a liquid level switch 92 and a housing 95 are provided.

The liquid level switch 92 includes an elongate sensing probe 94 with an upper end 96 adjacent a detector assembly 98 and a lower end 100 that terminates in a measurement tip 102. The sensing probe 94 has a core 104 that is preferably circular in cross section while the measurement tip 102 can be formed in a chisel or conical shape. A film or cladding 106 similar to the film material previously described can be applied to the core 104, including the measurement tip 102. The detector assembly 98 is preferably similar in construction to the detector assembly 24. The housing 95 is connected to the mounting head 18 and preferably extends along the length of the sensing probe 12 and sensing probe 94 to shield them from ambient light, sloshing liquid within the container 14 and consequent stresses on the probes. Openings 108 and 110 may be formed at the lower and upper ends, respectively, of the housing 95 to allow the ingress and egress of liquid and vapor as the liquid level changes within the container 14. Although the housing 95 is associated with the liquid level transducer 90, it is understood that any of the above-described embodiments can include a housing for protecting the sensing probe.

In operation, with a core and/or film material of the liquid level switch 92 having a higher index of refraction than the liquid being measured, it has been found that significant signal change occurs at the measurement tip 102 between dry and wet conditions and that little or no signal change occurs along the length of the probe 94 above the tip. It has also been found that the signal change is proportionate to the refractive indices of the liquids being measured, such as water, unleaded gasoline, and diesel fuel. Accordingly, the electrical signal generated by the photosensor of the detector assembly 98 abruptly increases or decreases as liquid covers or descends below the area of the measurement tip 102. The abrupt signal change can be used to trigger a visual or audio indicator to alert an operator that the liquid level in the container 14 is below a predetermined level. By way of example, the measurement tip 102 can be used for setting a low level switch point at a predetermined level, such as ⅛ tank. The switch point can then be used to alert an operator that the tank is approaching an empty condition. When the sensing probe 12 and sensing probe 94 are constructed of the same material, the switch point can be used to calibrate the sensing probe 12 for different liquids and/or different environmental conditions, such as fluctuations in ambient light, temperature, light source degradation over time, deterioration of the sensing probe 12, and contaminant build-up on the probe, since both probes will be affected. Accordingly, if the switch value of the sensing probe 94 changes due to contaminant build-up on the measurement tip or along the length of the probe 94, the measured values of the sensing probe 12 can be automatically adjusted to reflect the sensed environmental conditions. In addition, when the sensing probe 94 detects that the liquid level has dropped to and/or risen above the predetermined level, the measured values of the sensing probe 12 can be adjusted to reflect the actual liquid level through use of comparator circuitry, a microprocessor, or the like. By way of example, a plurality of predetermined values can be stored in a memory associated with the microprocessor. When one of the predetermined values has been reached, it is determined that the liquid is at a particular level in the container and the microprocessor can deliver the appropriate output to drive the display 36. When a calibration value is detected, such as when the liquid level descends below the measurement tip 102, it is determined that the calibration level has been reached. If the measurement value of the probe 12 at the calibration level does not reflect the calibration level, the stored values can be scaled or adjusted to reflect the actual level. In this manner, the sensing probe 12 can be automatically compensated for different environmental conditions. It will be appreciated that more than one switch 92 can be mounted in the container 14 at different predetermined levels for supplying additional calibration points.

In accordance with a further embodiment of the invention, the abrupt signal change can be used to automatically start operation of a pump (not shown) to fill the container with liquid to a predetermined level.

It is understood that terms of orientation and/or position as may be used throughout the specification, such as upper and lower, refer to relative rather than absolute orientations and/or positions.

It will be appreciated by those skilled in the art that changes could be made to the embodiments described above without departing from the broad inventive concept thereof. By way of example the sensing probe can have different cross sectional profiles, sizes, lengths, more or less elongate measurement faces, and so on. In accordance with yet a further embodiment of the invention, the sensing probe may be bent at one or more positions along its length to accommodate container or tank geometry or alternatively can be constructed of a flexible core material and restrained from movement within the container.

It is understood, therefore, that this invention is not limited to the particular embodiments disclosed, but it is intended to cover modifications within the spirit and scope of the present invention as defined by the appended claims.

I claim:

1. An optical transducer for determining liquid level within a container, the optical transducer comprising:
    a first sensing probe having a first elongate measurement face and a second elongate measurement face that converges toward the first elongate measurement face, at least a portion of the first and second elongate measurement faces being oriented at an angle less than 90 degrees;
    a first light source positioned for directing radiant energy into the sensing probe;
    a first photosensor positioned for detecting an amount of radiant energy exiting the sensing probe;
    wherein a change in the amount of radiant energy as detected by the photosensor is indicative of a change in liquid level within the container;
    a liquid level switch for sensing a predetermined liquid level within the container, the liquid level switch comprising:
        a second sensing probe having an elongate core with a measurement tip; and
        a second photosensor positioned for detecting an amount of radiant energy exiting the second sensing probe;
        wherein a change in the amount of radiant energy as detected by the second photosensor is indicative of the predetermined liquid level.

2. An optical transducer according to claim 1, wherein the sensing probe further comprises a third elongate measurement face that converges toward the second elongate measurement face.

3. An optical transducer according to claim 2, wherein the third elongate measurement face also converges toward the first elongate measurement face, at least a portion of the second and third elongate measurement faces being oriented at an angle less than 90 degrees such that the sensing probe is triangular in cross section.

4. An optical transducer according to claim 3, and further comprising a film covering the measurement faces.

5. An optical transducer according to claim 4, wherein the first sensing probe comprises a first transparent material with a first refractive index and the film comprises a second material with a second refractive index lower than the first refractive index.

6. An optical transducer according to claim 5, wherein the first transparent material comprises acrylic and the second transparent material comprises a fluorinated polymer.

7. An optical transducer according to claim 1, wherein the second elongate measurement surface is curved such that the sensing probe is half-round in cross section.

8. An optical transducer according to claim 1, and further comprising a film covering the measurement faces.

9. An optical transducer according to claim 8, wherein the first sensing probe comprises a first transparent material with a first refractive index and the film comprises a second material with a second refractive index lower than the first refractive index.

10. An optical transducer according to claim 9, wherein the first transparent material comprises acrylic and the second transparent material comprises a fluorinated polymer.

11. An optical transducer according to claim 1, wherein the light source and photosensor are positioned at a first end of the first sensing probe and further comprising a reflective element positioned at a second opposite end of the first sensing probe to redirect radiant energy from the light source toward the first end.

12. An optical transducer according to claim 1, wherein the liquid level switch further comprises
  a second light source positioned for directing radiant energy into the second sensing probe toward the measurement tip.

13. An optical transducer according to claim 12, and further comprising a film covering the first and second sensing probes.

14. An optical transducer according to claim 13, wherein the first and second sensing probes comprise a first transparent material with a first refractive index and the film comprises a second material with a second refractive index lower than the first refractive index.

15. An optical transducer according to claim 14, wherein at least one of the first and second refractive indices is greater than a refractive index of the liquid being measured.

16. An optical transducer according to claim 1, wherein the first sensing probe comprises a first transparent material with a refractive index that is greater than a refractive index of the liquid being measured.

17. An optical transducer for determining liquid level within a container, the optical transducer comprising:
  a first sensing probe having a first elongate measurement face and a second elongate measurement face that converges toward the first elongate measurement face, at least a portion of the first and second elongate measurement faces being oriented at an angle less than 90 degrees;
  a first light source positioned for directing radiant energy into the sensing probe;
  a first photosensor positioned for detecting an amount of radiant energy exiting the sensing probe;
  wherein a change in the amount of radiant energy as detected by the photosensor is indicative of a change in liquid level within the container;
  a liquid level switch for sensing a predetermined liquid level within the container; and
  means for sensing a value of the liquid level switch and compensating liquid level measurement of the first sensing probe based on the value of the liquid level switch.

* * * * *